United States Patent
Wang et al.

(10) Patent No.: US 10,303,006 B2
(45) Date of Patent: May 28, 2019

(54) LIQUID CRYSTAL LENS AND DISPLAY DEVICE

(71) Applicant: BOE TECHNOLOGY GROUP CO., LTD., Beijing (CN)

(72) Inventors: Haiyan Wang, Beijing (CN); Kun Wu, Beijing (CN); Yunyun Tian, Beijing (CN); Zheng Fang, Beijing (CN); Qiangtao Wang, Beijing (CN); Hyun Sic Choi, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 33 days.

(21) Appl. No.: 14/762,042

(22) PCT Filed: Jan. 4, 2015

(86) PCT No.: PCT/CN2015/070043
§ 371 (c)(1),
(2) Date: Jul. 20, 2015

(87) PCT Pub. No.: WO2015/135378
PCT Pub. Date: Sep. 17, 2015

(65) Prior Publication Data
US 2016/0252782 A1    Sep. 1, 2016

(30) Foreign Application Priority Data

Mar. 12, 2014  (CN) .......................... 2014 1 0090608

(51) Int. Cl.
*G02F 1/1343* (2006.01)
*G02B 3/14* (2006.01)
(Continued)

(52) U.S. Cl.
CPC ......... *G02F 1/134309* (2013.01); *G02B 3/14* (2013.01); *G02B 27/22* (2013.01);
(Continued)

(58) Field of Classification Search
CPC ....... G02F 1/29; G02B 27/2214; G02B 27/22; G02B 3/14
See application file for complete search history.

(56) References Cited

U.S. PATENT DOCUMENTS

2007/0195410 A1  8/2007  Yun et al.
2010/0238277 A1  9/2010  Takahashi et al.
(Continued)

FOREIGN PATENT DOCUMENTS

CN   101025490 A   8/2007
CN   101933170 A   9/2010
(Continued)

OTHER PUBLICATIONS

First Chinese Office Action Appln. No. 201410090608.8; dated Mar. 30, 2016.
(Continued)

*Primary Examiner* — James A Dudek
(74) *Attorney, Agent, or Firm* — Ladas & Parry LLP (57) ABSTRACT

A liquid crystal lens and a display device are provided. The liquid crystal lens includes: a first substrate and a second substrate arranged opposite to each other; a liquid crystal layer, located between the first substrate and the second substrate; a plurality of strip-shaped first electrodes, parallel to each other and located on a side of the first substrate facing the liquid crystal layer; a first alignment layer, located on a side of the first electrodes facing the liquid crystal layer; a planar second electrode, located on a side of the second substrate facing the liquid crystal layer; and a second alignment layer, located on a side of the second electrode facing the liquid crystal layer, wherein an included angle between an extending direction of each of the first electrodes and one edge (a) of the first substrate is greater than zero, a rubbing direction of the first alignment layer and a rubbing direction of the second alignment layer are symmetric with
(Continued)

respect to the extending direction of the first electrode, thereby ensuring that a liquid crystal lens with better symmetry can be acquired under smaller moiré pattern.

13 Claims, 6 Drawing Sheets

(51) Int. Cl.
  *G02B 27/22* (2018.01)
  *G02F 1/1337* (2006.01)
  *G02F 1/1335* (2006.01)
(52) U.S. Cl.
  CPC ..... *G02B 27/2214* (2013.01); *G02F 1/13439* (2013.01); *G02F 1/133528* (2013.01); *G02F 1/133784* (2013.01); *G02F 2001/133531* (2013.01); *G02F 2001/133749* (2013.01)

(56) References Cited

U.S. PATENT DOCUMENTS

| | | | | |
|---|---|---|---|---|
| 2012/0038854 | A1* | 2/2012 | Inoue | G02B 27/2214 349/96 |
| 2012/0257127 | A1 | 10/2012 | Miyazawa et al. | |
| 2013/0063691 | A1* | 3/2013 | Takama | G02F 1/29 349/143 |
| 2013/0107174 | A1 | 5/2013 | Yun et al. | |
| 2013/0235305 | A1* | 9/2013 | Takama | G02F 1/133528 349/96 |
| 2013/0258214 | A1* | 10/2013 | Kizu | G02F 1/133526 349/5 |
| 2013/0314627 | A1 | 11/2013 | Liu et al. | |
| 2013/0335385 | A1* | 12/2013 | Kim | H04N 13/0409 345/204 |
| 2014/0049709 | A1* | 2/2014 | Kashiwagi | G02F 1/29 349/33 |
| 2014/0063382 | A1 | 3/2014 | Wu | |
| 2014/0125934 | A1* | 5/2014 | Naganuma | G02F 1/133784 349/123 |
| 2015/0009437 | A1* | 1/2015 | Takagi | G02F 1/13306 349/33 |
| 2015/0124183 | A1* | 5/2015 | Choi | G02B 27/2214 349/15 |
| 2016/0054573 | A1* | 2/2016 | Kasano | H04N 13/0415 349/33 |

FOREIGN PATENT DOCUMENTS

| | | |
|---|---|---|
| CN | 102629041 A | 8/2012 |
| CN | 202443185 U | 9/2012 |
| CN | 102736330 A | 10/2012 |
| CN | 102902127 A | 1/2013 |
| CN | 103309116 A | 9/2013 |
| CN | 103365026 A | 10/2013 |
| CN | 203732853 U | 7/2014 |
| CN | 103984181 A | 8/2014 |
| JP | 2013-076918 A | 4/2013 |
| JP | 2013-231745 A | 11/2013 |

OTHER PUBLICATIONS

International Search Report Appln. No. PCT/CN2015/070043; dated Apr. 17, 2015.

Written Opinion of the International Searching Authority Appln. No. PCT/CN2015/070043; dated Apr. 17, 2015.

Extended European Search Report dated Nov. 10, 2017; Appln. 15749710.8.

* cited by examiner

FIG. 4c

LIQUID CRYSTAL LENS AND DISPLAY DEVICE

TECHNICAL FIELD

Embodiments of the invention relate to a liquid crystal lens and a display device

BACKGROUND

A common 3D display device comprises a display panel and a liquid crystal lens arranged on a light exiting side of the display panel, the 3D display device forms a plurality of viewing regions on the light exiting side of the display panel by using the liquid crystal lens, so that light emitted from different pixel units of the display panel can go into different viewing regions, resulting in a 3D sense.

Figure 1A:
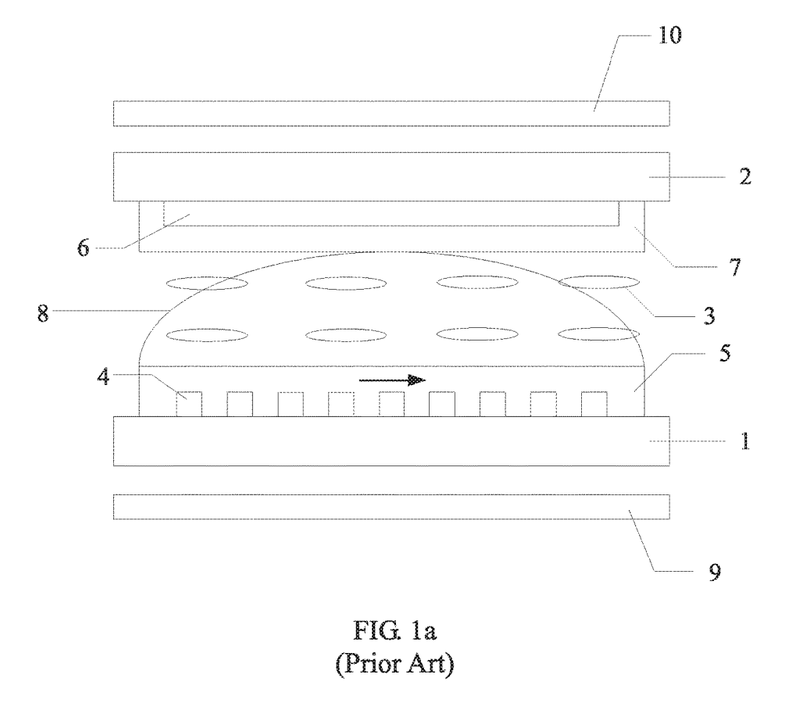
FIG. 1a is a cross-section structural schematic diagram of an existing liquid crystal lens.

An existing liquid crystal lens, as shown in FIG. 1a, comprises: a first substrate 1 and a second substrate 2, arranged opposite to each other; a liquid crystal layer 3, disposed between the first substrate 1 and the second substrate 2; first electrodes 4, disposed on a side of the first substrate 1 facing the liquid crystal layer 3; a first alignment layer 5, located on a side of the first electrodes 4 facing the liquid crystal layer 3; a second electrode 6, located on a side of the second substrate 2 facing the liquid crystal layer 3; a second alignment layer 7, located on a side of the second electrode 6 facing the liquid crystal layer 3; a first polarizer 9, located on a side of the first substrate 1 away from the liquid crystal layer 3; and a second polarizer 10, located on a side of the second substrate 2 away from the liquid crystal layer 3, wherein, generally, the first electrodes 4 are designed into strip electrodes, and the second electrode 6 is designed as a plane electrode. The liquid crystal lens may be divided into a plurality of liquid crystal lens units, and each of the liquid crystal lens units comprises a plurality of the first electrodes 4; only one liquid crystal lens unit 8 is shown in FIG. 1a, voltages applied to a plurality of first electrodes 4 in one liquid crystal lens unit 8 are symmetric with respect to a center position of the liquid crystal lens unit 8.

Figure 1B:
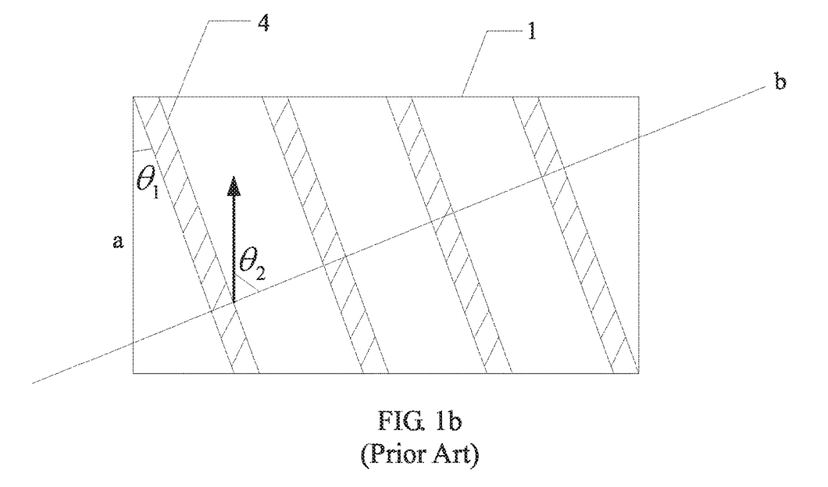
Figure 1C:
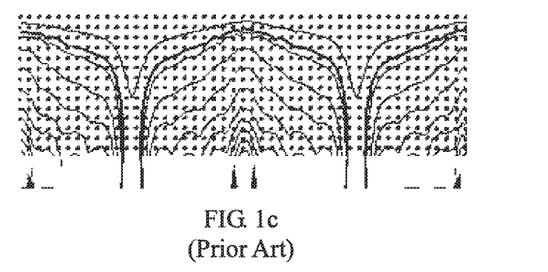
FIG. 1c is a curve diagram of voltage applied to the existing liquid crystal lens.
Figure 1D:
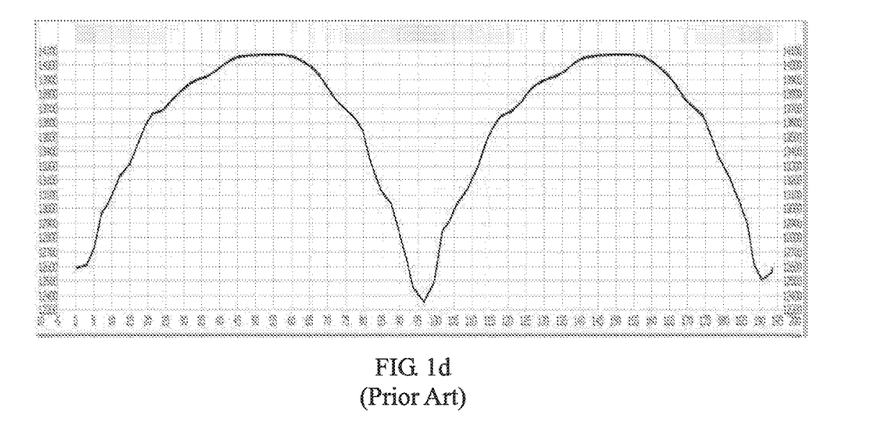
FIG. 1d is a phase delay curve diagram obtained after applying voltage shown in FIG. 1c to the existing liquid crystal lens.

In order to reduce moire pattern, an extending direction of the strip-shaped first electrode 4 is usually set to have an included angle with respect to one edge of the first substrate 1. In an actual fabrication process of liquid crystal lens, rubbing directions of the first alignment layer 5 and the second alignment layer 7 are usually set to be parallel to one edge of the first substrate 1 or the second substrate 2. In this way, in the formed liquid crystal lens, there is an included angle between the rubbing direction of the first alignment layer 5 or the rubbing direction of the second alignment layer 7 and the extending direction of the first electrode 4. For example, in a liquid crystal lens having a structure shown in FIG. 1b, an included angle θ₁ between the extending direction of the first electrode 4 and an edge a of the first substrate 1 is 18.43°, both the rubbing directions of the first alignment layer 5 and the second alignment layer 7 and light transmitting axial directions of the first polarizer 9 and the second polarizer 10 (a direction shown by a solid line arrow in FIG. 1b) are parallel to the edge a of the first substrate 1; when a pre-tilting angle of liquid crystal molecules is 2° and symmetric voltages shown in FIG. 1c are applied to the first electrodes 4, a cross-section b perpendicular to the extending direction of the first electrode 4 is selected for simulating, i.e., included angles θ₂ between the selected cross-section b and the rubbing directions of the first alignment layer 5 and the second alignment layer 7 as well as the light transmitting axial directions of the first polarizer 9 and the second polarizer 10 are 71.57°, and a phase delay curve is obtained as shown in FIG. 1d, in which a horizontal coordinate represents a coordinate of a point on the liquid crystal lens, and a longitudinal coordinate represents a phase of the point, it can be seen that from FIG. 1d, the phase delay curve of the liquid crystal lens is obviously not symmetric, so the display quality of the liquid crystal lens when applied in 3D display will be significantly affected.

SUMMARY OF THE INVENTION

Embodiments of the present invention provide a liquid crystal lens and a display device, ensuring that the liquid crystal lens with better symmetry can be acquired under smaller moire pattern.

In one aspect, an embodiment of the present invention provides a liquid crystal lens, comprising: a first substrate and a second substrate, arranged opposite to each other; a liquid crystal layer, located between the first substrate and the second substrate; a plurality of strip-shaped first electrodes, parallel to each other and located on a side of the first substrate facing the liquid crystal layer; a first alignment layer, located on a side of the first electrodes facing the liquid crystal layer; a planar second electrode, located on a side of the second substrate facing the liquid crystal layer; and a second alignment layer, located on a side of the second electrode facing the liquid crystal layer, wherein an included angle between an extending direction of each of the first electrodes and an edge of the first substrate is greater than zero, a rubbing direction of the first alignment layer and a rubbing direction of the second alignment layer are symmetric with respect to the extending direction of the first electrode.

In another aspect, an embodiment of the present invention further provides a liquid crystal lens, comprising: a first substrate and a second substrate, arranged opposite to each other; a liquid crystal layer, located between the first substrate and the second substrate; a plurality of strip-shaped first electrodes, parallel to each other and located on a side of the first substrate facing the liquid crystal layer; a first alignment layer, located on a side of the first electrodes facing the liquid crystal layer; a planar second electrode, located on a side of the second substrate facing the liquid crystal layer; and a second alignment layer, located on a side of the second electrode facing the liquid crystal layer, wherein an included angle between an extending direction of each of the first electrodes and an edge of the first substrate is greater than zero, a rubbing direction of the first alignment layer is same as a rubbing direction the second alignment layer.

In still another aspect, an embodiment of the present invention further provides a display device, comprising: a display panel; and the above-described liquid crystal lens arranged on a light exiting side of the display panel.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

FIG. 1b is a plane structural schematic diagram of a strip electrode of the existing liquid crystal lens shown in FIG. 1a;

DESCRIPTION OF THE EMBODIMENTS

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

In connection with drawings, a liquid crystal lens and a display device provided by embodiments of the present invention will be described in detail hereinafter.

Figure 2A:
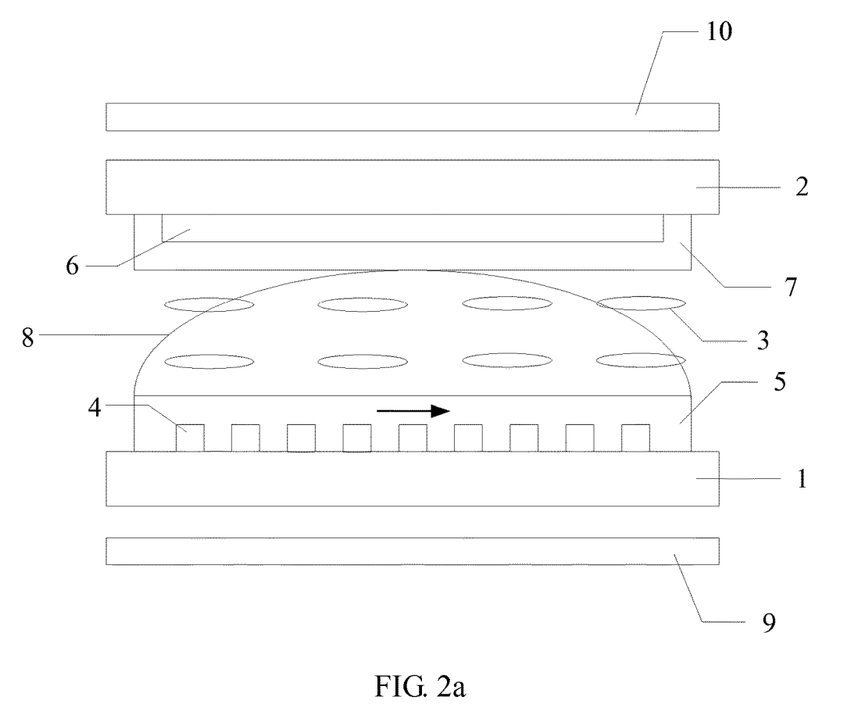
FIG. 2a is a cross-sectional structural schematic diagram of a liquid crystal lens according to an embodiment of the present invention.
Figure 2B:
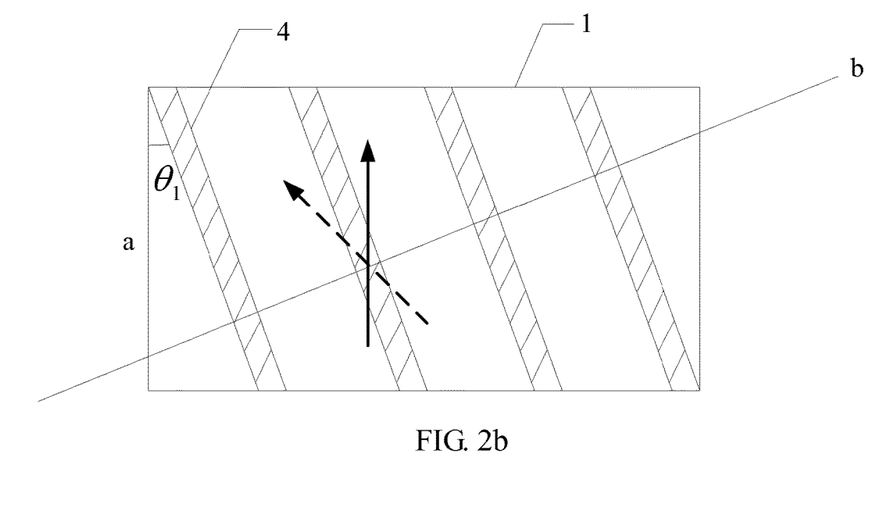
FIG. 2b is a plane structural schematic diagram of a strip electrode of the liquid crystal lens according to the embodiment of the present invention.

An embodiment of the present invention provides a liquid crystal lens, comprising: a first substrate 1 and a second substrate 2 arranged opposite to each other; a liquid crystal layer 3 located between the first substrate 1 and the second substrate 2; a plurality of strip-shaped first electrodes 4, parallel to each other and located on a side of the first substrate 1 facing the liquid crystal layer 3; a first alignment layer 5 located on a side of the first electrodes 4 facing the liquid crystal layer 3; a planar second electrode 6 located on a side of the second substrate 2 facing the liquid crystal layer 3; and a second alignment layer 7 located on a side of the second electrode 6 facing the liquid crystal layer 3, as shown in FIG. 2a, FIG. 2a shows a cross-sectional structural diagram of the liquid crystal lens according to an embodiment of the present invention. In addition, FIG. 2b shows a plane structural diagram of a strip electrode of the liquid crystal lens according to the embodiment of the present invention; as shown in FIG. 2b, in the liquid crystal lens provided by the embodiment of the present invention, an included angle $\theta_1$ between an extending direction of the first electrode 4 and one edge a of the first substrate 1 is greater than zero. Exemplarily, a rubbing direction of the first alignment layer 5 (a direction shown by solid line arrow in FIG. 2b) and a rubbing direction of the second alignment layer 7 (a direction shown by dotted line arrow in FIG. 2b) are symmetric with respect to the extending direction of the first electrode 4.

Exemplarily, the rubbing direction of the first alignment layer 5 may also be the direction shown by dotted line arrow in FIG. 2b, and the rubbing direction of the second alignment layer 7 may be the direction shown by solid line arrow in FIG. 2b, which are not limited herein.

In the liquid crystal lens provided by the embodiment of the present invention, the included angle $\theta_1$ between the extending direction of the first electrode 4 and one edge a of the first substrate 1 is greater than zero. Thus, in a case of smaller moire pattern, the rubbing direction of the first alignment layer 5 and the rubbing direction of the second alignment layer 7 are arranged to be symmetric with respect to the extending direction of the first electrode 4, the liquid crystal lens is formed by controlling liquid crystal molecules to rotate while applying voltages to the first electrodes and the second electrode, so a focus point of the formed liquid crystal lens can be located on a central axis, thereby ensuring that a liquid crystal lens with better symmetry can be acquired under smaller moire pattern.

Exemplarily, in the liquid crystal lens provided by the embodiment of the present invention, a tilting direction of the extending direction of the first electrode 4 with respect to one edge a of the first substrate 1 may be a direction shown in FIG. 2b; or, the tilting direction of the extending direction of the first electrode 4 with respect to the edge a of the first substrate 1 may be a direction opposite to the tilting direction shown in FIG. 2b, which are not limited herein.

Exemplarily, for convenience of implementation, in the liquid crystal lens provided by the embodiment of the present invention, as shown in FIG. 2b, the rubbing direction of the first alignment layer 5 may be arranged to be parallel to one edge a of the first substrate 1; or, the rubbing direction of the second alignment layer 7 may be arranged to be parallel to one edge a of the first substrate 1, which are not limited herein.

Further, in order to make the formed liquid crystal lens have better symmetry, in the liquid crystal lens provided by the embodiment of the present invention, an included angle between the extending direction of the first electrode 4 and one edge a of the first substrate 1 may be 18.43°, 15.53°, 12.53° or 9.57°.

Further, in order to filter stray light from the light emitted from the liquid crystal lens, and improve the display quality of a display device with the liquid crystal lens, the liquid crystal lens provided by an embodiment of the present invention, as shown in FIG. 2a, further comprises: a first polarizer 9 located on a side of the first substrate 1 away from the liquid crystal layer 3 and a second polarizer 10 located on a side of the second substrate 2 away from the liquid crystal layer 3; wherein, a light transmitting axial direction of the first polarizer 9 may be arranged to be same as the rubbing direction of the first alignment layer 5, i.e., the direction shown by solid line arrow in FIG. 2b; and a light transmitting axial direction of the second polarizer 10 may be arranged to be same as the rubbing direction of the second alignment layer 7, i.e., the direction shown by dotted line arrow in FIG. 2b.

Exemplarily, in the liquid crystal lens provided by an embodiment of the present invention, a groove in the first alignment layer 5 and the second alignment layer 7 is configured to make a pre-tilting angle of liquid crystal molecules in the liquid crystal layer 3 greater than 0° and less than or equal to 2°.

Exemplarily, in the liquid crystal lens provided by an embodiment of the present invention, the liquid crystal lens is divided into a plurality of liquid crystal lens units 8 along an arrangement direction of the first electrodes 4 (an arrow direction shown in FIG. 2a), and each of the liquid crystal lens units comprises a plurality of the first electrodes 4; in each liquid crystal lens unit 8, in a direction from an edge position to a center position of the liquid crystal lens unit 8, an voltage applied to the first electrode 4 gradually increases or gradually decreases, and voltages applied to the two first electrodes 4 symmetric with respect to the center position are equal, that is, in each liquid crystal lens unit, voltages applied to the first electrodes are symmetric with respect to the center position of the liquid crystal lens unit. For example, the voltages applied to the first electrodes in one liquid crystal lens unit 8 may be 5.5V-3.3V-2.4V-1.7V-0.2V-1.7V-2.4V-3.3V-5.5V.

Exemplarily, in each liquid crystal lens unit, a plurality of strip-shaped first electrodes may be arranged to space from each other at an equal interval.

It should be noted here that, for each liquid crystal lens unit, if an even number of first electrodes are arranged therein, the center position of the liquid crystal lens unit is a middle position between two adjacent first electrodes in the middle; if an odd number of first electrodes are arranged therein, the center position of the liquid crystal lens unit is a center of a middlemost first electrode, and no first electrode is symmetric to the middlemost first electrode in the center position of the liquid crystal lens unit.

A specific example is taken to illustrate the symmetry of the phase delay curve of the liquid crystal lens with the structure shown in FIG. 2b in detail hereinafter.

A first example: an included angle $\theta_1$ between the extending direction of the first electrode 4 and one edge a of the first substrate 1 is 18.43°; the rubbing direction of the first alignment layer 5 and the rubbing direction of the second alignment layer 7 are symmetric with respect to the extending direction of the first electrode 4, and their included angles with respect to the extending direction of the first electrode 4 are both 18.43°, wherein, the rubbing direction of the first alignment layer 5 is parallel to one edge a of the first substrate 1; a groove in the first alignment layer 5 and the second alignment layer 7 is configured to make a pre-tilting angle of liquid crystal molecules in the liquid crystal layer 3 equal to 2°; a light transmitting axial direction of the first polarizer 9 is same as the rubbing direction of the first alignment layer 5, and a light transmitting axial direction of the second polarizer 10 is same as the rubbing direction of the second alignment layer 7.

Figure 2C:
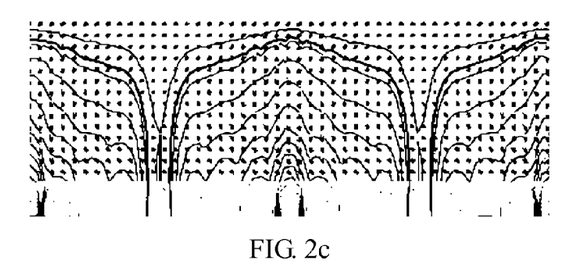
FIG. 2c is a curve diagram of voltage applied to the liquid crystal lens according to the embodiment of the present invention.
Figure 2D:
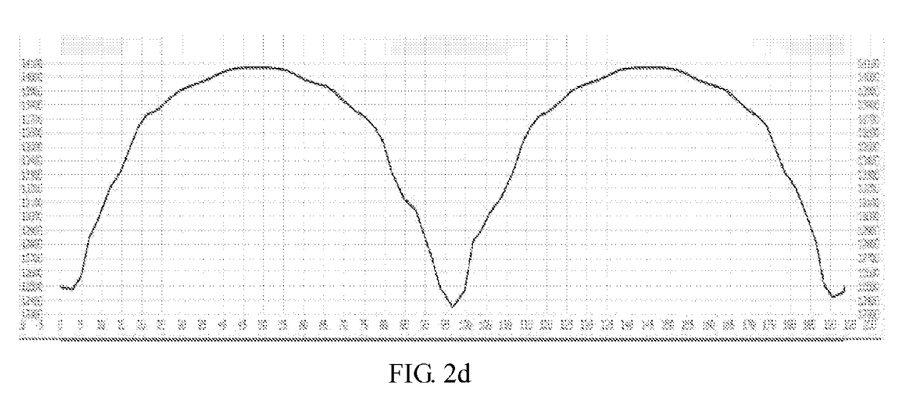
FIG. 2d is a phase delay curve diagram obtained after applying voltage shown in FIG. 2c to the liquid crystal lens according to the embodiment of the present invention.

The liquid crystal lens shown in FIG. 2b is applied an voltage shown in FIG. 2c, a plane perpendicular to the extending direction of the first electrode 4 is selected as a cross-section b for simulating, i.e., the included angles between the selected cross-section b and the rubbing direction of the first alignment layer 5 as well as the light transmitting axial direction of the first polarizer 9 are 71.57°, and the included angles between the selected cross-section b and the rubbing direction of the second alignment layer 7 as well as the light transmitting axial direction of the second polarizer 10 are 108.43°, so as to obtain a phase delay curve as shown in FIG. 2d, and it can be seen from FIG. 2d that the phase delay curve of the liquid crystal lens has better symmetry.

Figure 3A:
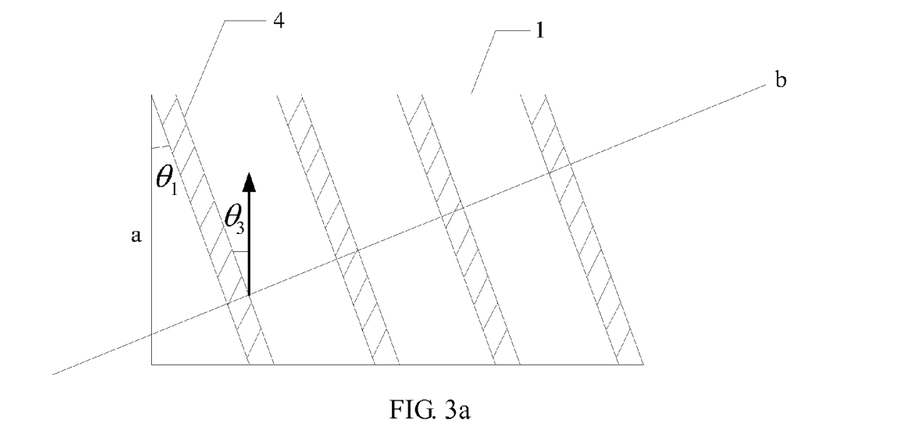
FIG. 3a is another plane structural schematic diagram of a strip electrode of a liquid crystal lens according to an embodiment of the present invention.

In another aspect, an embodiment of the present invention further provides another liquid crystal lens, comprising: a first substrate 1 and a second substrate 2 arranged opposite to each other; a liquid crystal layer 3 located between the first substrate 1 and the second substrate 2; a plurality of strip-shaped first electrodes 4, parallel to each other and located on a side of the first substrate I facing the liquid crystal layer 3; a first alignment layer 5 located on a side of the first electrodes 4 facing the liquid crystal layer 3; a planar second electrode 6 located on a side of the second substrate 2 facing the liquid crystal layer 3; and a second alignment layer 7 located on a side of the second electrode 6 facing the liquid crystal layer 3, as shown in FIG. 2a, FIG. 2a shows a cross-sectional structural diagram of a liquid crystal lens according to an embodiment of the present invention. In addition, in the liquid crystal lens provided by the embodiment of the present invention, as shown in FIG. 3a, an included angle $\theta_1$ between an extending direction of the first electrode 4 and one edge a of the first substrate 1 is greater than zero; a rubbing direction of the first alignment layer 5 is same as a rubbing direction of the second alignment layer 7 (an arrow direction shown in FIG. 3a), and has an included angle $\theta_3$ greater than zero with respect to the extending direction of the first electrode 4.

Exemplarily, a groove in the first alignment layer 5 and the second alignment layer 7 is configured to make a pre-tilting angle of liquid crystal molecules in the liquid crystal layer 3 greater than or equal to 5° and less than or equal to 15°. The liquid crystal lens is divided into a plurality of liquid crystal lens units 8 along an arrangement direction of the first electrodes 4 (the arrow direction shown in FIG. 2a), and each liquid crystal lens unit 8 comprises a plurality of first electrodes 4; in one liquid crystal lens unit 8, for the first electrodes 4 arranged along a direction from an edge position to a center position of the liquid crystal lens unit 8, applied voltages gradually increase or gradually decrease, and voltages applied to the two first electrodes 4 symmetric with respect to the center position are not equal, that is, the voltages are asymmetric, for example, the voltages applied to the first electrodes 4 in one liquid crystal lens unit 8 may be 5.5V-3.3V-2.4V-1.7V-0.2V-2.2V-2.5V-3.4V-5.5V.

Exemplarily, in each liquid crystal lens unit, a plurality of strip-shaped first electrodes may be arranged to space from each other at an equal interval.

It should be noted here that, for each liquid crystal lens unit, if an even number of first electrodes are arranged therein, the center position of the liquid crystal lens unit is a middle position between two adjacent first electrodes in the middle; if an odd number of first electrodes are arranged therein, the center position of the liquid crystal lens unit is a center of a middlemost first electrode.

In the liquid crystal lens provided by an embodiment of the present invention, the included angle $\theta_1$ between the extending direction of the first electrode 4 and one edge a of the first substrate 1 is greater than zero; thus, in a case of smaller moire pattern, by applying asymmetric voltages to the strip-shaped first electrodes in one liquid crystal lens unit 8, and increasing the pre-tilting angle of liquid crystal molecule, a liquid crystal lens is formed by controlling the liquid crystal molecules to rotate while applying voltages to the first electrodes 4 and the second electrode 6, so a focus point of the formed liquid crystal lens can be located on a central axis, thereby ensuring that the liquid crystal lens with better symmetry can be acquired under smaller moire pattern.

Exemplarily, in the liquid crystal lens provided by an embodiment of the present invention, a tilting direction of the extending direction of the first electrode 4 with respect to one edge a of the first substrate 1 may be a direction shown in FIG. 3a; or, the tilting direction of the extending direction of the first electrode 4 with respect to one edge a of the first substrate 1 may be a direction opposite to the direction shown in FIG. 3a, which are not limited herein.

Exemplarily, in the liquid crystal lens provided by an embodiment of the present invention, tilting directions of the rubbing direction of the first alignment layer 5 and the rubbing direction of the second alignment layer 7 with respect to the extending direction of the first electrode 4 may be directions shown in FIG. 3a; or, the tilting directions of the rubbing direction of the first alignment layer 5 and the rubbing direction of the second alignment layer 7 with respect to the extending direction of the first electrode 4 may be directions opposite to the tilting directions shown in FIG. 3a, which are not limited herein.

Exemplarily, in the liquid crystal lens provided by an embodiment of the present invention, as shown in FIG. 3a, an included angle $\theta_3$ between the rubbing direction of the first alignment layer 5 or the rubbing direction of the second alignment layer 7 and the extending direction of the first electrode 4 may be or may not be same as the included angle $\theta_1$ between the extending direction of the first electrode 4 and one edge a of the first substrate, which are not limited herein.

Exemplarily, for convenience of implementation, in the liquid crystal lens provided by an embodiment of the present invention, as shown in FIG. 3a, the rubbing direction of the first alignment layer 5 and the rubbing direction of the second alignment layer 7 may be arranged to be parallel to one edge a of the first substrate 1.

Further, in order to make the formed liquid crystal lens have better symmetry, in the liquid crystal lens provided by an embodiment of the present invention, an included angle between the extending direction of the first electrode 4 and one edge a of the first substrate 1 may be 18.43°, 15.53°, 12.53° or 9.57°.

Further, in order to filter stray light from the light emitted from the liquid crystal lens, and improve the display quality of a display device with the liquid crystal lens, the liquid crystal lens provided by an embodiment of the present invention, as shown in FIG. 2a, further comprises: a first polarizer 9 located on a side of the first substrate 1 away from the liquid crystal layer 3 and a second polarizer 10 located on a side of the second substrate 2 away from the liquid crystal layer 3; wherein, a light transmitting axial direction of the first polarizer 9 may be arranged to be same as the rubbing direction of the first alignment layer 5; and a light transmitting axial direction of the second polarizer 10 may be arranged to be same as the rubbing direction of the second alignment layer 7.

A specific example is taken to illustrate the symmetry of the phase delay curve of the liquid crystal lens with the structure shown in FIG. 3a in detail hereinafter.

A second example: an included angle $\theta_1$ between the extending direction of the first electrode 4 and one edge a of the first substrate 1 is 18.43°; the rubbing direction of the first alignment layer 5 and the rubbing direction of the second alignment layer 7 are parallel to the edge a of the first substrate 1, i.e., an included angle $\theta_3$ between the rubbing direction of the first alignment layer 5 or the rubbing direction of the second alignment layer 7 and the extending direction of the first electrode 4 is 18.43°; a groove in the first alignment layer 5 and the second alignment layer 7 is to control a pre-tilting angle of liquid crystal molecules in the liquid crystal layer 3 to be 5°; a light transmitting axial direction of the first polarizer 9 is same as a light transmitting axial direction of the second polarizer 10, and both the light transmitting axial direction of the first polarizer 9 and the light transmitting axial direction of the second polarizer 10 are parallel to the one edge a of the first substrate 1, i.e., both the light transmitting axial direction of the first polarizer 9 and the light transmitting axial direction of the second polarizer 10 are same as the rubbing direction of the first alignment layer 5 and the rubbing direction of the second alignment layer 7.

Figure 3B:
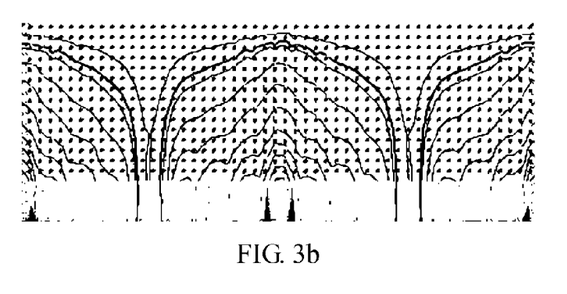
FIG. 3b is a curve diagram of voltage applied to the liquid crystal lens according to the embodiment of the present invention.
Figure 3C:
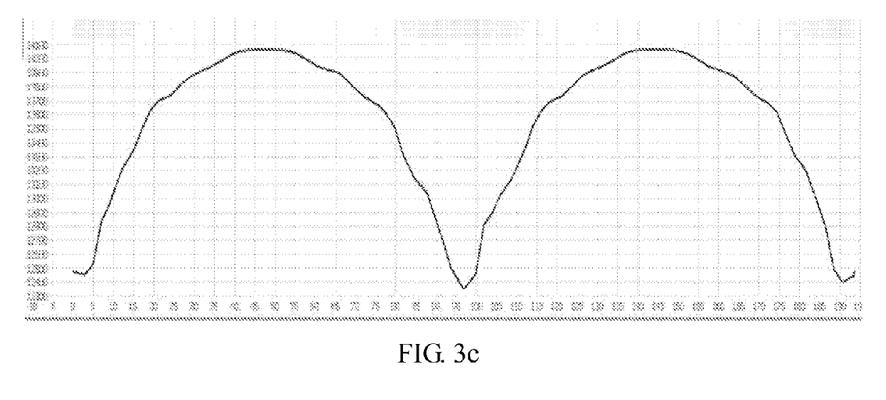
FIG. 3c is a phase delay curve diagram obtained after applying voltage shown in FIG. 3b to the liquid crystal lens according to the embodiment of the present invention.

The liquid crystal lens shown in FIG. 3a is applied a voltage shown in FIG. 3b, a plane perpendicular to the extending direction of the first electrode 4 is selected as a cross-section b for simulating, i.e., the included angles between the selected cross-section 11 and the rubbing directions of the first alignment layer 5 and the second alignment layer 7 as well as the light transmitting axial directions of the first polarizer 9 and the second polarizer 10 are 71.57°, to obtain a phase delay curve as shown in FIG. 3c, in which a horizontal coordinate represents a coordinate of a point on the liquid crystal lens, and a longitudinal coordinate represents a phase of the point, it can be seen from FIG. 3c, the phase delay curve of the liquid crystal lens has better symmetry.

In still another aspect, an embodiment of the present invention further provides another liquid crystal lens, comprising: a first substrate 1 and a second substrate 2 arranged opposite to each other; a liquid crystal layer 3 located between the first substrate 1 and the second substrate 2; a plurality of strip-shaped first electrodes 4, parallel to each other and located on a side of the first substrate 1 facing the liquid crystal layer 3; a first alignment layer 5 located on a side of the first electrodes 4 facing the liquid crystal layer 3; a planar second electrode 6 located on a side of the second substrate 2 facing the liquid crystal layer 3; and a second alignment layer 7 located on a side of the second electrode 6 facing the liquid crystal layer 3, as shown in FIG. 2a, FIG. 2a shows a cross-sectional structural diagram of a liquid crystal lens according to an embodiment of the present invention. In addition, in the liquid crystal lens provided by the embodiment of the present invention, as shown in FIG. 4a, an included angle $\theta_1$ between an extending direction of the first electrode 4 and one edge a of the first substrate 1 is greater than zero; a rubbing direction of the first alignment layer 5 and a rubbing direction of the second alignment layer 7 (a direction shown by solid line arrow in FIG. 4a) are same as the extending direction of the first electrode 4.

In the liquid crystal lens provided by the embodiment of the present invention, the included angle $\theta_1$ between the extending direction of the first electrode 4 and one edge a of the first substrate 1 is greater than zero; thus, in a case of smaller moire pattern, by arranging the rubbing direction of the first alignment layer 5 and the rubbing direction of the second alignment layer 7 to be same as the extending direction of the first electrode 4, a liquid crystal lens is formed by controlling the liquid crystal molecules to rotate while applying voltages to the first electrodes and the second electrode, so a focus point of the formed liquid crystal lens can be located on a central axis, thereby ensuring that a liquid crystal lens with better symmetry can be acquired under smaller moire pattern.

Figure 4A:
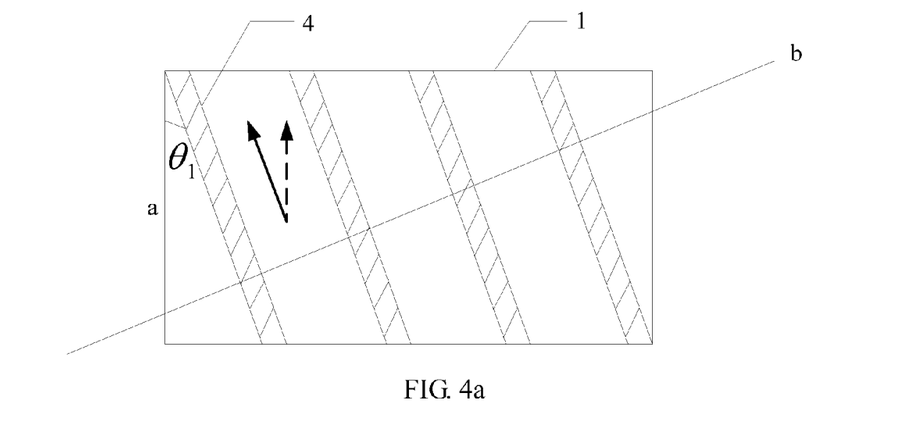
FIG. 4a is still another plane structural schematic diagram of a strip electrode of a liquid crystal lens according to an embodiment of the present invention.

When the liquid crystal lens provided by an embodiment of the present invention are actually implemented, a tilting direction of the extending direction of the first electrode 4 with respect to one edge a of the first substrate 1 may be a direction shown in FIG. 4a; or, the tilting direction of the extending direction of the first electrode 4 with respect to one edge a of the first substrate 1 may be a direction opposite to the direction shown in FIG. 4a, which are not limited herein.

Exemplarily, in order to make the formed liquid crystal lens have better symmetry, in the liquid crystal lens provided by an embodiment of the present invention, the included angle $\theta_1$ between the extending direction of the first electrode 4 and one edge a of the first substrate 1 may be 18.43°, 15.53°, 12.53° or 9.57°.

Further, in order to filter stray light from the light emitted from the liquid crystal lens, and improve the display quality of a display device with the liquid crystal lens, the liquid crystal lens provided by an embodiment of the present invention, as shown in FIG. 2a, further comprises: a first polarizer 9 located on a side of the first substrate 1 away from the liquid crystal layer 3 and a second polarizer 10 located on a side of the second substrate 2 away from the liquid crystal layer 3; wherein, a light transmitting axial direction of the first polarizer 9 may be arranged to be same as a light transmitting axial direction of the second polarizer 10 (a direction of a dotted line arrow shown in FIG. 4a), and is different from the rubbing direction of the first alignment layer 5.

Exemplarily, for convenience of implementation, in the liquid crystal lens provided by an embodiment of the present invention, as shown in FIG. 4a, both the light transmitting axial direction of the first polarizer 9 and the light transmitting axial direction of the second polarizer 10 are arranged to be parallel to one edge a of the first substrate 1.

Exemplarily, in the liquid crystal lens provided by an embodiment of the present invention, a groove in the first alignment layer 5 and the second alignment layer 7 is arranged to make a pre-tilting angle of liquid crystal molecules in the liquid crystal layer greater than 0° and less than or equal to 2°.

Exemplarily, in the liquid crystal lens provided by an embodiment of the present invention, the liquid crystal lens is divided into a plurality of liquid crystal lens units 8 along an arrangement direction of the first electrodes 4 (see the arrow direction shown in FIG. 2a), and each of the liquid crystal lens units 8 comprises a plurality of the first electrodes 4; in one liquid crystal lens unit 8, for the first electrodes 4 arranged along a direction from an edge position to a center position of the liquid crystal lens unit 8, applied voltages gradually increase or gradually decrease, and voltages applied to the two first electrodes 4 symmetric with respect to the center position are equal. For example, the voltages applied to the first electrodes 4 in one liquid crystal lens unit 8 may be 5.5V-3.3V-2.4V-1.7V-0.2V-1.7V-2.4V-3.3V-5.5V.

Exemplarily, in each liquid crystal lens unit, a plurality of strip-shaped first electrodes may be arranged to space from each other at an equal interval.

It should be noted here that, for each liquid crystal lens unit, if an even number of first electrodes are arranged therein, the center position of the liquid crystal lens unit is a middle position between two adjacent first electrodes in the middle; if an odd number of first electrodes are arranged therein, the center position of the liquid crystal lens unit is a center of a middlemost first electrode, and no first electrode is symmetric to the middlemost first electrode in the center position of the liquid crystal lens unit.

A specific example is taken to illustrate the symmetry of the phase delay curve of the liquid crystal lens with the structure shown in FIG. 4a in detail hereinafter.

A third example: an included angle $\theta_1$ between the extending direction of the first electrode 4 and one edge a of the first substrate 1 is 18.43°; the rubbing direction of the first alignment layer 5 and the rubbing direction of the second alignment layer 7 are parallel to the extending direction of the first electrode 4, i.e., an included angle between the rubbing direction of the first alignment layer 5 or the rubbing direction of the second alignment layer 7 and one edge a of the first substrate 1 is 18.43°; a groove in the first alignment layer 5 and the second alignment layer 7 is to control a pre-tilting angle of liquid crystal molecules in the liquid crystal layer 3 to be 2°; a light transmitting axial direction of the first polarizer 9 and a light transmitting axial direction of the second polarizer 10 are parallel to one edge a of the first substrate 1.

Figure 4B:
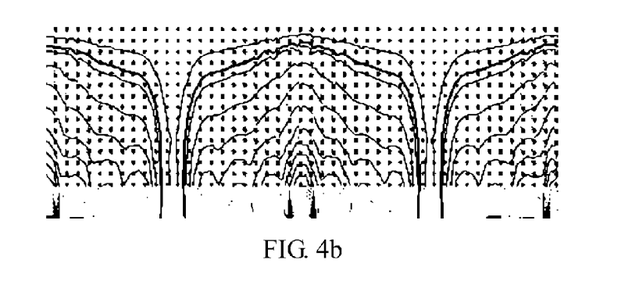
FIG. 4b is a curve diagram of voltage applied to the liquid crystal lens according to the embodiment of the present invention.
Figure 4C:
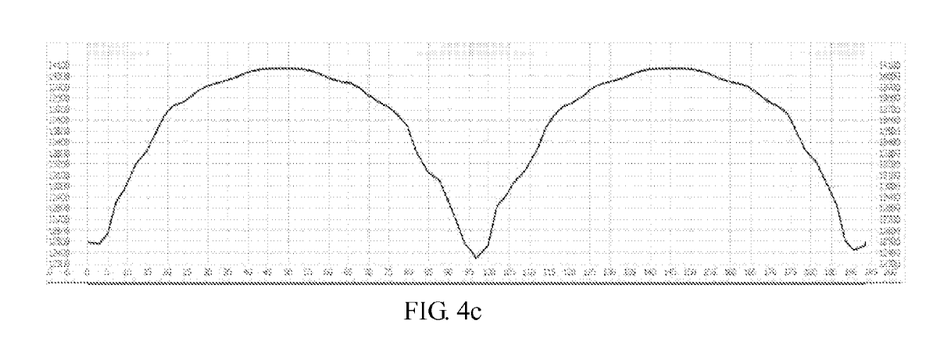
FIG. 4c is a phase delay curve diagram obtained after applying voltage shown in FIG. 4b to the liquid crystal lens according to the embodiment of the present invention.

The liquid crystal lens shown in FIG. 4a is applied a voltage shown in FIG. 4b, a plane perpendicular to the extending direction of the first electrode 4 is selected as a cross-section b for simulating, i.e., the selected cross-section b is perpendicular to the rubbing direction of the first alignment layer 5 and the rubbing direction of the second alignment layer 7, and the included angles between the selected cross-section b and the light transmitting axial direction of the first polarizer 9 and the light transmitting axial direction of the second polarizer 10 are 71.57°, to obtain a phase delay curve as shown in FIG. 4c, and it can be seen from FIG. 4c, a horizontal coordinate represents a coordinate of a point on the liquid crystal lens, and a longitudinal coordinate represents a phase of the point, and the phase delay curve of the liquid crystal lens has better symmetry.

It should be noted that, in embodiments of the present invention, "symmetric voltages" mean that voltages applied to the first electrodes symmetric with respect to a center position of each liquid crystal lens unit are equal, while "asymmetric voltages" mean that voltages applied to the first electrodes symmetric with respect to a center position of the liquid crystal lens unit are not equal.

In still another aspect, an embodiment of the present invention further provides a display device, comprising: a display panel; and any liquid crystal lens according to an embodiment of the present invention arranged on a light exiting side of the display panel. The display device may be any product or part with a display function, such as a mobile phone, a tablet computer, a television, a monitor, a laptop computer, a digital photo frame and a navigator and so on.

The embodiments of the present invention provides a liquid crystal lens and a display device, an included angle between an extending direction of a first electrode and one edge of a first substrate is greater than zero; in the case of smaller moire pattern, by arranging a rubbing direction of a first alignment layer and a rubbing direction of a second alignment layer to be symmetric with respect to the extending direction of the first electrode; or, by applying asymmetric voltages to the strip-shaped first electrodes in one liquid crystal lens unit, and increasing a pre-tilting angle of a liquid crystal molecule; or, by arranging the rubbing direction of the first alignment layer and the rubbing direction of the second alignment layer to be same as the extending direction of the first electrode, a liquid crystal lens is formed by controlling the liquid crystal molecules to rotate while applying voltages to the first electrodes and the second electrode, so a focus point of the formed liquid crystal lens can be located on a central axis, thereby ensuring that a liquid crystal lens with better symmetry can be acquired under smaller moire pattern.

It is evident that one person skilled in the art can make various changes or modifications to the present invention without departing from the spirit and scope of the invention. Thus, if these changes and modifications to the present invention are within the scope of the claims of the present invention and equivalents, the present invention also intends to include all such changes and modifications within its scope.

The present application claims priority of Chinese Patent Application No. 201410090608.8 filed on Mar. 12, 2014, the disclosure of which is incorporated herein by reference in its entirety as part of the present application.

What is claimed is:

1. A liquid crystal lens, comprising:
   a first substrate and a second substrate, arranged opposite to each other;
   a liquid crystal layer, located between the first substrate and the second substrate;
   a plurality of strip-shaped first electrodes, parallel to each other and located on a side of the first substrate facing the liquid crystal layer;
   a first alignment layer, located on a side of the first electrodes facing the liquid crystal layer;
   a planar second electrode, located on a side of the second substrate facing the liquid crystal layer; and
   a second alignment layer, located on a side of the second electrode facing the liquid crystal layer,
   wherein an included angle between an extending direction of each of the first electrodes and an edge of the first substrate is greater than zero; and
   wherein a rubbing direction of the first alignment layer and a rubbing direction of the second alignment layer are symmetric with respect to the extending direction of the first electrode;
   wherein the liquid crystal lens further comprises a first polarizer located on a side of the first substrate away from the liquid crystal layer and a second polarizer located on a side of the second substrate away from the liquid crystal layer, and a light transmitting axial direction of the first polarizer and a light transmitting axial direction of the second polarizer are symmetric with respect to the extending direction of the first electrode;
   wherein the liquid crystal lens is divided into a plurality of liquid crystal lens units along an arrangement direction of the first electrodes, each of the liquid crystal lens units comprising more than one first electrode; and
   wherein in each of the liquid crystal lens units: voltages applied to the first electrodes gradually increase along each direction from a corresponding edge position to a center position of the liquid crystal lens unit, or voltages applied to the first electrodes gradually decrease along each direction from the corresponding edge position to the center position of the liquid crystal lens unit, and a phase delay curve of each of the liquid crystal lens units is substantially symmetric.

2. The liquid crystal lens according to claim 1, wherein the rubbing direction of the first alignment layer or the rubbing direction of the second alignment layer is parallel to the edge of the first substrate.

3. The liquid crystal lens according to claim 1, wherein the included angle between the extending direction of each of the first electrodes and the edge of the first substrate is 18.43°, 15.53°, 12.53° or 9.57°.

4. The liquid crystal lens according to claim 3, wherein the light transmitting axial direction of the first polarizer is same as the rubbing direction of the first alignment layer; and the light transmitting axial direction of the second polarizer is same as the rubbing direction of the second alignment layer.

5. The liquid crystal lens according to claim 1, wherein a groove in the first alignment layer and the second alignment layer is configured to make a pre-tilting angle of liquid crystal molecules in the liquid crystal layer greater than 0° and less than or equal to 2°.

6. The liquid crystal lens according to claim 1,
   wherein in each of the liquid crystal lens units, voltages applied to each two first electrodes that are symmetric with respect to the center position are equal.

7. A liquid crystal lens, comprising:
   a first substrate and a second substrate, arranged opposite to each other;
   a liquid crystal layer, located between the first substrate and the second substrate;
   a plurality of strip-shaped first electrodes, parallel to each other and located on a side of the first substrate facing the liquid crystal layer;
   a first alignment layer, located on a side of the first electrodes facing the liquid crystal layer;
   a planar second electrode, located on a side of the second substrate facing the liquid crystal layer; and
   a second alignment layer, located on a side of the second electrode facing the liquid crystal layer;
   wherein an included angle between an extending direction of each of the first electrodes and an edge of the first substrate is greater than zero;
   wherein a rubbing direction of the first alignment layer is same as a rubbing direction the second alignment layer;
   wherein the liquid crystal lens further comprises a first polarizer located on a side of the first substrate away from the liquid crystal layer and a second polarizer located on a side of the second substrate away from the liquid crystal layer, and a light transmitting axial direction of the first polarizer is same as a light transmitting axial direction of the second polarizer and is different from the rubbing direction of the first alignment layer;
   wherein the liquid crystal lens is divided into a plurality of liquid crystal lens units along an arrangement direction of the first electrodes, each of the liquid crystal lens units comprising more than one first electrode; and
   wherein in each of the liquid crystal lens units: voltages applied to the first electrodes gradually increase along each direction from a corresponding edge position to a center position of the liquid crystal lens unit, or voltages applied to the first electrodes gradually decrease along each direction from the corresponding edge position to the center position of the liquid crystal lens unit, and a phase delay curve of each of the liquid crystal lens units is substantially symmetric.

8. The liquid crystal lens according to claim 7, wherein the rubbing direction of the first alignment layer and the rubbing direction of the second alignment layer are same as the extending direction of each of the first electrodes.

9. The liquid crystal lens according to claim 8, wherein a groove in the first alignment layer and the second alignment layer are configured to make a pre-tilting angle of liquid crystal molecules in the liquid crystal layer greater than 0° and less than or equal to 2°.

10. The liquid crystal lens according to claim 7, wherein the light transmitting axial direction of the first polarizer and the light transmitting axial direction of the second polarizer are parallel to the edge of the first substrate.

11. The liquid crystal lens according to claim 8,
wherein in each of the liquid crystal lens units, voltages applied to each two first electrodes that are symmetric with respect to the center position are not equal.

12. The liquid crystal lens according to claim 7, wherein the included angle between the extending direction of each of the first electrodes and the edge of the first substrate is 18.43°, 15.53°, 12.53° or 9.57°.

13. A display device, comprising:
a display panel; and
a liquid crystal lens, according to claim 1 and arranged on a light exiting side of the display panel.

* * * * *